United States Patent
Tseng et al.

(12)

(10) Patent No.: US 6,411,279 B1
(45) Date of Patent: Jun. 25, 2002

(54) CABLELESS MOUSE POWER SAVING DEVICE

(75) Inventors: Chi Wen Tseng; Wang Lun, both of Taipei (TW)

(73) Assignee: Behavior Tech Computer Corp., Taipei (TW)

( * ) Notice: Subject to any disclaimer, the term of this patent is extended or adjusted under 35 U.S.C. 154(b) by 0 days.

(21) Appl. No.: 09/333,674

(22) Filed: Jun. 16, 1999

(51) Int. Cl.[7] .................................................. G09G 5/08
(52) U.S. Cl. ........................................................ 345/163
(58) Field of Search ................................. 345/163, 158, 345/211, 157, 168, 164, 165, 166; 463/39

(56) References Cited

U.S. PATENT DOCUMENTS

| | | | | |
|---|---|---|---|---|
| 4,754,268 A | * | 6/1988 | Mori ............................. | 345/163 |
| 5,515,051 A | * | 5/1996 | Tanaka et al. ................ | 341/174 |
| 5,528,265 A | * | 6/1996 | Harrison ...................... | 345/158 |
| 5,854,621 A | * | 12/1998 | Junod et al. .................. | 345/158 |

* cited by examiner

Primary Examiner—Richard Hjerpe
Assistant Examiner—Ronald Laneau
(74) Attorney, Agent, or Firm—Rosenberg, Klein & Lee

(57) ABSTRACT

A power saving device is adapted to be incorporated in a cableless computer mouse for reducing power consumption thereof. The power saving device includes a wheel rotatable in unison with an encoding disk of the mouse and at least one pair of conductive contact members respectively connected to a power source and a microprocessor. The contact members have engaging sections forming a normally open loop. The wheel forms a plurality of alternating conductive and nonconductive sections engaging with the engaging sections of the contact members. The conductive sections are electrically connected to each other and may short the contact members when simultaneously engaging with the engaging sections. A control signal is thus generated and applied to the microprocessor of the mouse. The microprocessor may force the mouse into an idle condition for reducing power consumption after having not received the control signal for a predetermined period of time.

5 Claims, 2 Drawing Sheets

CABLELESS MOUSE POWER SAVING DEVICE

FIELD OF THE INVENTION

The present invention generally relates to a cableless computer mouse, and in particular to a power saving device for cableless computer mouse which facilitates power management of a cableless computer mouse.

BACKGROUND OF THE INVENTION

A computer mouse is a widely-used input device of a computer system, especially in an icon-based computer system. Conventionally, a computer mouse is connected to a computer system by a cable for transmitting signal/power therebetween. The cable, however, hinders efficient and unobstructed movement of the mouse causing inconvenience to a user. A cableless mouse that communicates with a computer system by means of electromagnetic signals for data transmission overcomes the problem. However, since no cable connects between the mouse and the computer system, the mouse has to incorporate an independent power source therein for powering itself Thus, power management becomes an important issue in the field of cableless mouse.

Thus, it is desired to provide a power saving device for a cableless mouse for facilitating power management of the cableless mouse.

SUMMARY OF THE INVENTION

Accordingly, an object of the present invention is to provide a power saving device of a cableless mouse for reducing power consumption thereof.

To achieve the above object, in accordance with the present invention, there is provided a cableless mouse power saving device comprising a wheel mounted in the mouse and rotatable in unison with an encoding disk thereof and at least one pair of conductive contact members respectively connected to a power source and a microprocessor. The contact members have engaging sections forming a normally open loop. The wheel forms a plurality of alternating conductive and nonconductive sections engaging with the engaging sections of the contact members. The conductive sections are electrically connected to each other and may short the contact members when simultaneously engaging with the engaging sections. A control signal is thus generated and applied to the microprocessor of the mouse. The microprocessor may force the mouse into an idle condition for reducing power consumption after having not received the control signal for a predetermined period of time.

BRIEF DESCRIPTION OF THE DRAWINGS

The present invention will be apparent to those skilled in the art by reading the following description of preferred embodiments thereof, with reference to the accompanying drawings, in which.

DETAILED DESCRIPTION OF THE PREFERRED EMBODIMENTS

Figure 1:
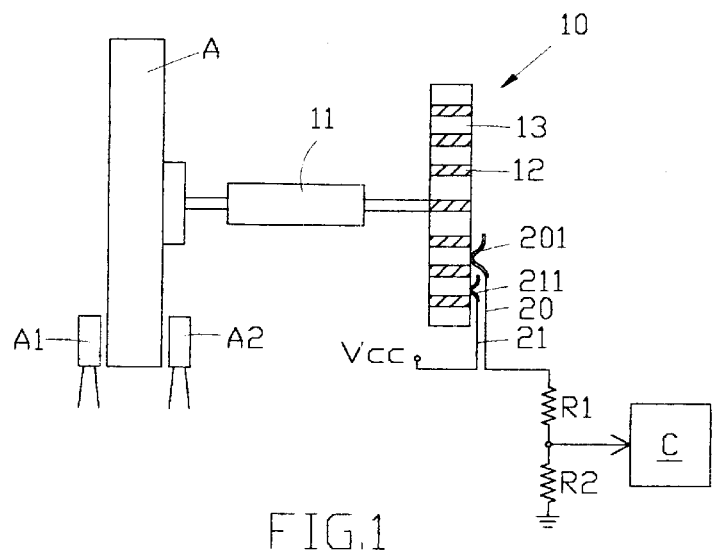
FIG. 1 is a schematic side elevational view of a cableless mouse power saving device constructed in accordance with a first embodiment of the present invention.
Figure 2:
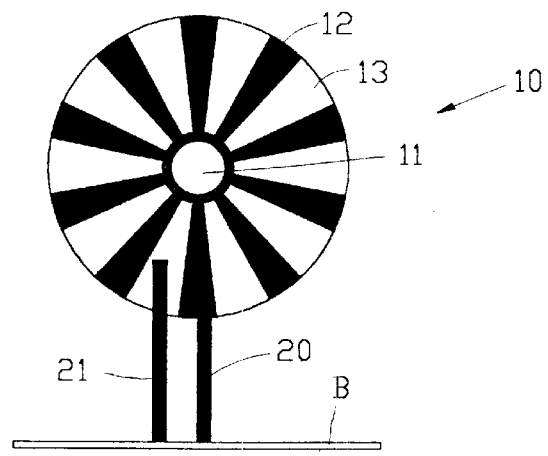
FIG. 2 is a front view of a control wheel and resilient contact members of the cableless mouse power saving device in accordance with the first embodiment of the present invention.

With reference to the drawings and in particular to FIGS. 1 and 2, wherein a power saving device constructed in accordance with a first embodiment of the present invention is shown, the power saving device is mounted in a computer mouse having a rotatable encoding disk A and a pair of mating photo-electrical elements A1, A2 for generating encoded signals applied to and processed by a microprocessor C mounted on a circuit board B. The power saving device of the present invention comprises a control wheel 10 co-axially coupled to the encoding disk A by means of a coupling shaft 11 to be rotatable in unison therewith. A plurality of conductive and nonconductive zones 12, 13 are formed on the control wheel 10. For example, the control wheel may be made of insulative material on which conductive traces are formed. The conductive and nonconductive zones 12, 13 may be arranged in any desired fashion and are preferably, alternate with each other as shown in FIG. 2. All the conductive zones 12 are electrically connected to each other and serve as shorting means to be further described hereinafter.

First and second conductive contact members 20, 21 are mounted on the circuit board B of the computer mouse and electrically connected to the microprocessor C and a power source VCC of the mouse respectively. The first and second contact members 20, 21 form a normally open electrical loop which is closed when the contact members 20, 21 are shorted by the shorting means.

Each contact member 20, 21 has an engaging section 201, 211 in the form of a V-shape. The V-shaped engaging sections 201, 211 are resiliently supported on the circuit board B and biased to engage with a surface of the control wheel 10 whereby when the mouse is operating, the encoding disk A rotates and drives the control wheel 10 thereby causing the contact members 20, 21 to be shorted by simultaneously engaging with the conductive zones 12 and forming a closed loop between the power source VCC and the microprocessor C. A control signal caused by shorting the contact members 20, 21 is thus applied to the microprocessor C.

If desired, a voltage division circuit comprising resistors R1, R2 is connected between the microprocessor C and the first contact member 20.

The microprocessor C may be programmed to cut off power supplied to the photo-electrical elements A1, A2 and a signal transmitter circuit of the mouse when no control signal from the first contact member 20 has been received for a predetermined period of time. The microprocessor C may also enter an idle condition. This reduces the power consumption of the mouse.

Once a control signal is generated due to movement of the mouse and applied to the microprocessor C via the first contact member 20, the microprocessor C resumes working condition and supplies power to the photo-electrical elements A1, A2 and the transmitter circuit. By this way, the overall power consumption of the cableless computer mouse is substantially reduced and the service life of the power source thereof is extended.

It is obvious to those skilled in the art that the first and second contact members 20, 21 may form a normally-closed electrical loop which is opened by the rotation of the control wheel 10 to generate the control signal. Thus, in accordance with the present invention, a change of an electrical engagement status between the engaging sections 201, 211 is adapted to generate the control signal. In other words, in the embodiment illustrated, the electrical engagement status between the engaging sections 201, 211 changes from an open condition (the first engagement status) to a closed condition (the second engagement status) by the shorting means. Of course, the first and the second engagement status may be switched with each other.

Figure 3:
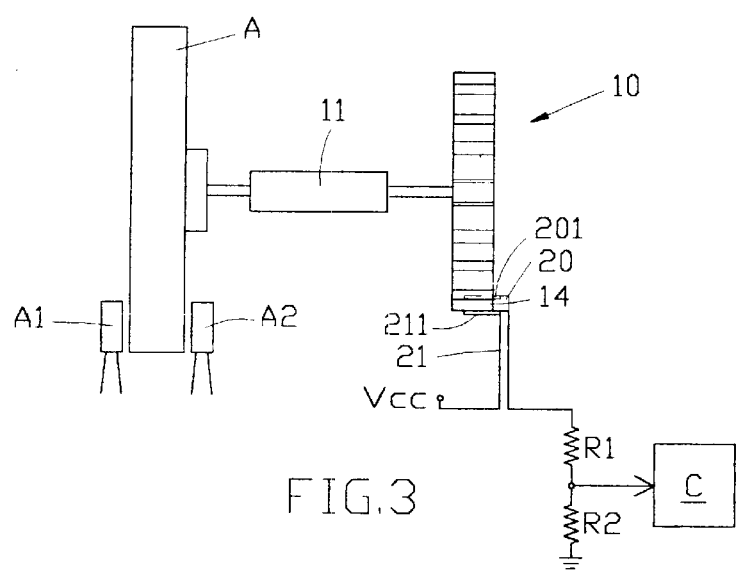
FIG. 3 a schematic side elevational view of a cableless mouse power saving device constructed in accordance with a second embodiment of the present invention.
Figure 4:
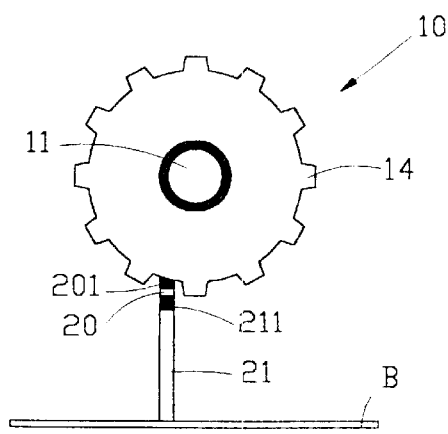
FIG. 4 is a front view of a control wheel and resilient contact members of the cableless mouse power saving device in accordance with the second embodiment of the present invention.

FIGS. 3 and 4 show a second embodiment in accordance with the present invention. In the second embodiment, the control wheel 10 forms no alternate conductive and nonconductive zones 12, 13. Instead, a plurality of teeth 14 are formed on a periphery of the control wheel 10. The engaging sections 201, 211 of the contact members 20, 21 are arranged to be positioned spaced from and adjacent each other with the engaging section 201 of the first contact member 20 above and opposite the engaging section 211 of the second contact member 21 whereby when the control wheel 10 is driven by the encoding disk A, the teeth 14 engage with and deflect the first engaging section 201 to contact the second engaging section 211 thereby generating and applying control signals to the microprocessor C.

Figure 5:
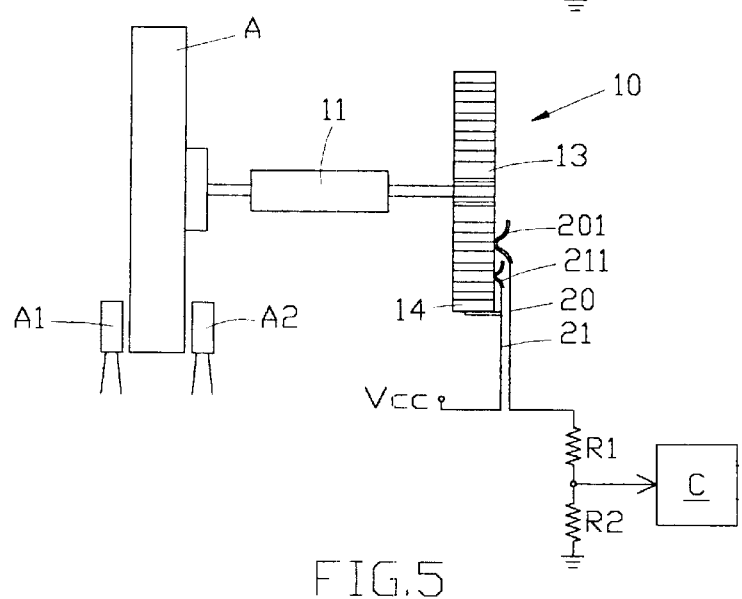
FIG. 5 is a schematic side elevational view of a cableless mouse power saving device constructed in accordance with a third embodiment of the present invention.
Figure 6:
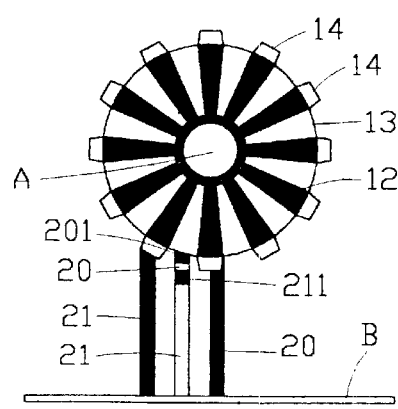
FIG. 6 is a front view of a control wheel and resilient contact members of the cableless mouse power saving device in accordance with the third embodiment of the present invention.

FIGS. 5 and 6 show a third embodiment of the present invention which is a combination of the first and second embodiment, wherein the control wheel 10 comprises alternate conductive and nonconductive zones 12, 13 and peripheral teeth 14. Two pair of first and second contact members 20, 21 are mounted on the circuit board B. The engaging sections 201, 211 of the first pair of contact members 20, 21 are V-shaped and engage with the conductive and nonconductive zones 12, 13 thereby selectively shorted by the conductive zones 12. The engaging sections 201, 211 of the second pair of the contact members 20, 21 are engaged with and deflected by the peripheral teeth 14 and thus shorting each other. Both pairs of first and second contact members 20, 21 generate and apply control signals to the microprocessor C when shorted. This ensures a more reliable operation as compared with the first and second embodiments for a control signal may be generated when either pair of the first and second contact members is shorted.

Although the present invention has been described with respect to preferred embodiments, it is contemplated that a variety of modifications, variations and substitutions may be done without departing from the scope of the present invention that is intended to be defined by the appended claims.

What is claimed is:

1. A power saving device for a cableless computer mouse having a member movable in accordance with movement of the mouse, the power saving device comprising:

a wheel rotatable corresponding to the movement of the movable member;

at least one pair of resilient conductive contact members having engaging sections assuming a first electrical engagement status therebetween, the engaging sections being actuable by the rotation of the wheel to change from the first electrical engagement status to a second electrical engagement status thereby generating a control signal, the engaging sections engaging a surface of the wheel, the first electrical engagement status being an open condition between the engaging sections and the second engagement status being a closed condition between the engaging sections;

control means operable to cut off power supplied to a transmitter circuit of the cableless mouse when having not received the control signal from the contact members for a predetermined period and resuming the power supply when receiving the control signal again; and, shorting means formed on the wheel for shorting the engaging sections when the wheel rotates; the shorting means including a conductive trace formed on the surface of the wheel which selectively and simultaneously engages with the engaging sections for thereby shorting the engaging sections and generating the control signal.

2. The power saving device as claimed in claim 1, wherein the shorting means comprises a plurality of conductive sections alternating a number of nonconductive sections, the conductive sections being electrically connected to each other.

3. The power saving device as claimed in claim 1, wherein the power saving device comprises a second pair of contact members having engaging sections and wherein the shorting means further comprises a plurality of teeth formed on a periphery of the wheel, the rotation of the wheel causing the teeth to contact and deflect a first engaging sections of the second pair of contact members to engage with a second engaging section of the second pair of contact members thereby shorting the engaging sections of the second pair of contact members and generating the control signal.

4. The power saving device as claimed in claim 1, wherein the engaging sections have a V-shape engaging with the surface of the wheel.

5. A power saving device for a cableless computer mouse having a member movable in accordance with movement of the mouse, the power saving device comprising:

a wheel rotatable corresponding to the movement of the movable member;

at least one pair of resilient conductive contact members having engaging sections assuming a first electrical engagement status therebetween, the engaging sections being actuable by the rotation of the wheel to change from the first electrical engagement status to a second electrical engagement status thereby generating a control signal, the first electrical engagement status being an open condition between the engaging sections and the second engagement status being a closed condition between the engaging sections;

control means operable to cut off power supplied to a transmitter circuit of the cableless mouse when having not received the control signal from the contact members for a predetermined period and resuming the power supply when receiving the control signal again; and, shorting means formed on the wheel for shorting the engaging sections when the wheel rotates, the shorting means including a plurality of teeth formed on a periphery of the wheel, the rotation of the wheel causing the teeth to contact and deflect a first engaging section to engage with a second engaging section for thereby shorting the engaging sections and generating the control signal.

* * * * *